June 22, 1948.  H. E. CARNAGUA ET AL  2,443,597
MULTIPLE CLUTCH CONSTRUCTION WITH SYNCHRONIZING
CLUTCHES FOR CHANGE SPEED TRANSMISSION
Filed June 26, 1943  5 Sheets-Sheet 1
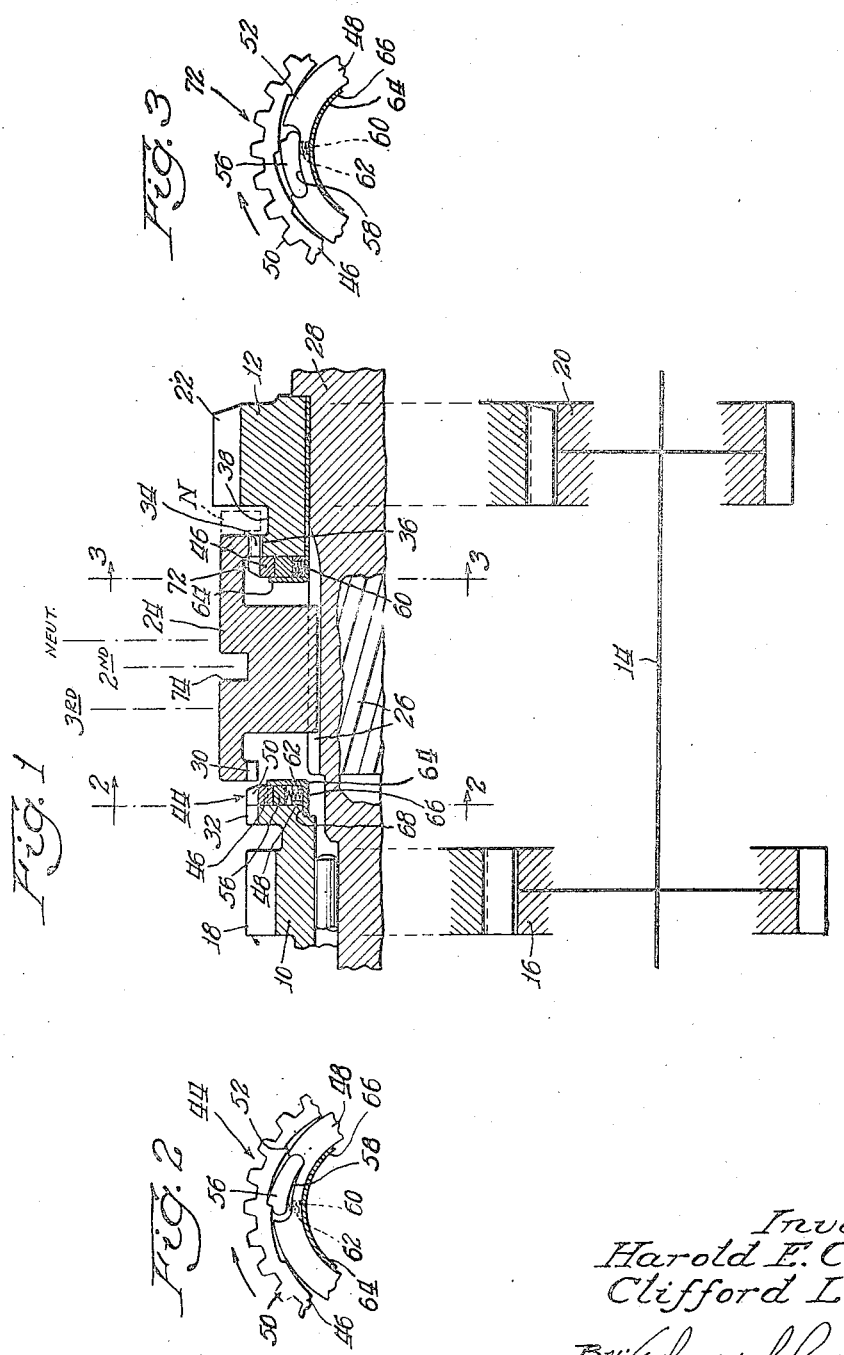
Inventors:
Harold E. Carnagua
Clifford L. Swift
By: Edward C. Fritzbaugh
Atty.

June 22, 1948.                H. E. CARNAGUA ET AL            2,443,597
         MULTIPLE CLUTCH CONSTRUCTION WITH SYNCHRONIZING
              CLUTCHES FOR CHANGE SPEED TRANSMISSION
Filed June 26, 1943                                    5 Sheets-Sheet 2
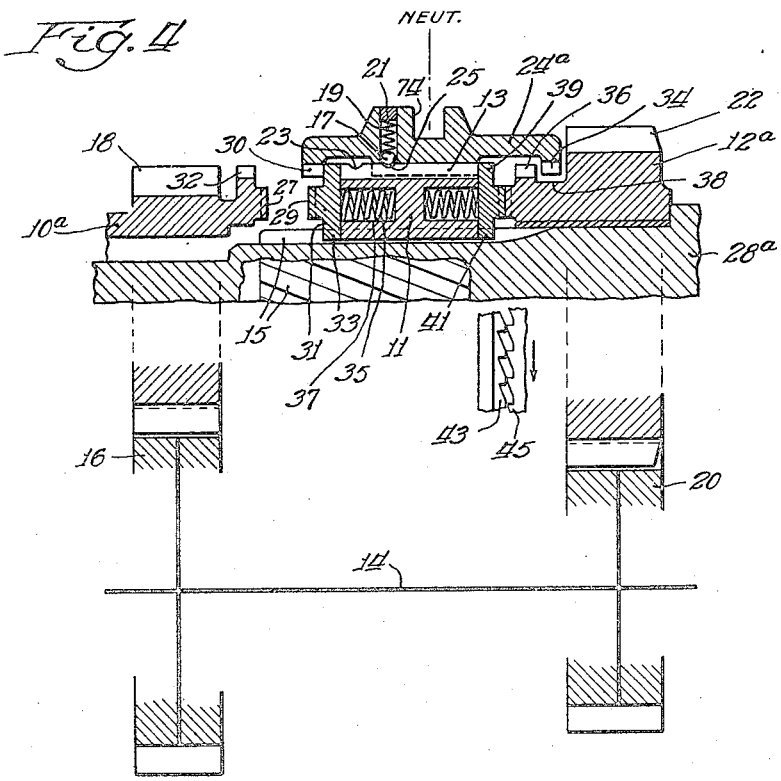
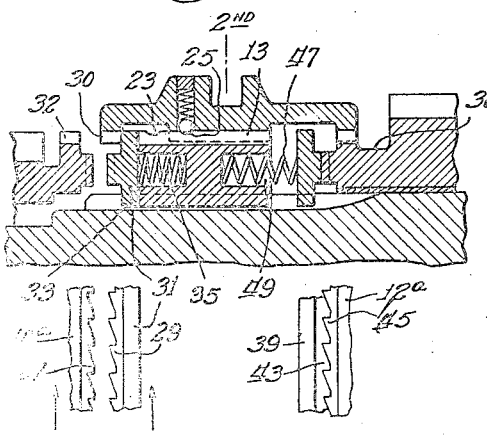
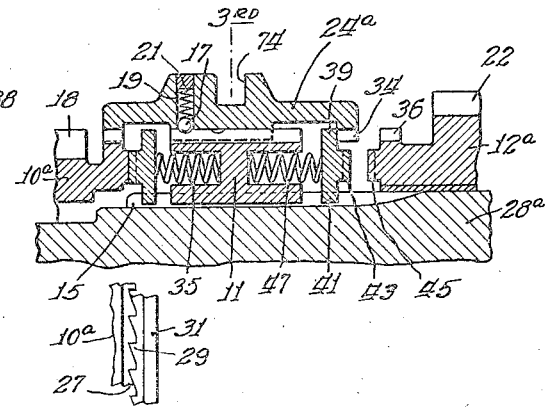
Inventors:
Harold E. Carnagua
Clifford L. Swift
By: Edward O. Fitzhaugh
Atty.

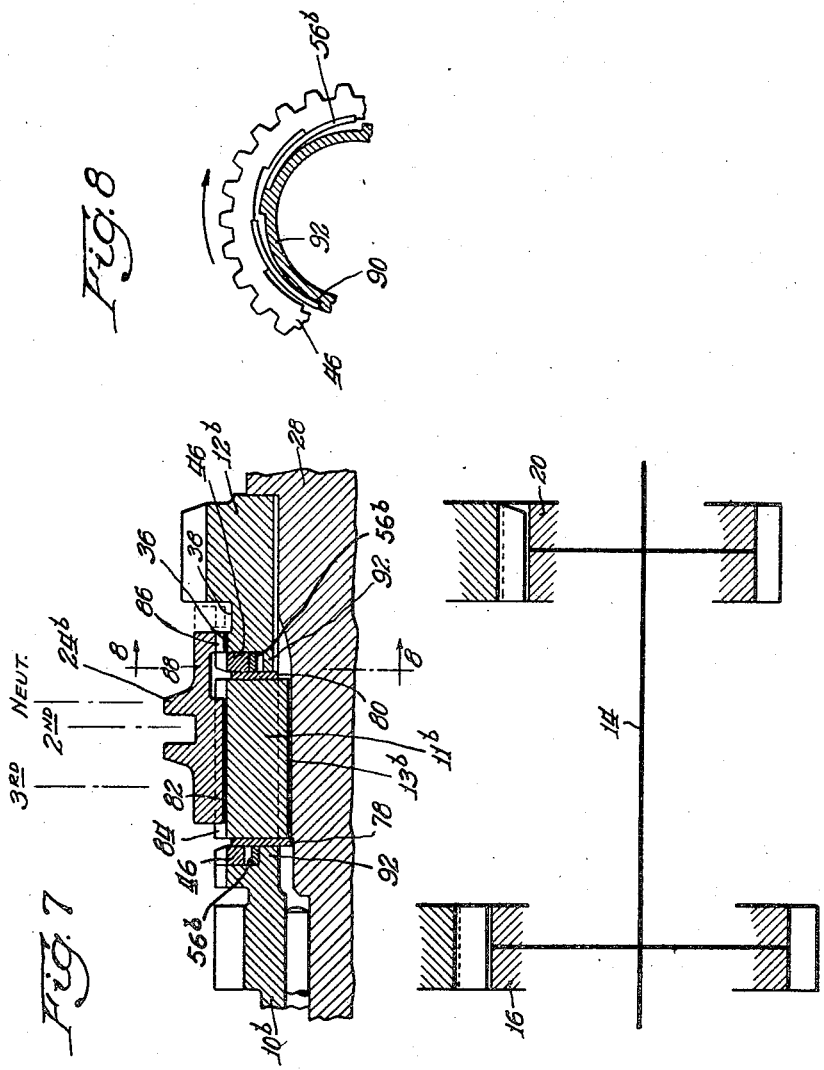

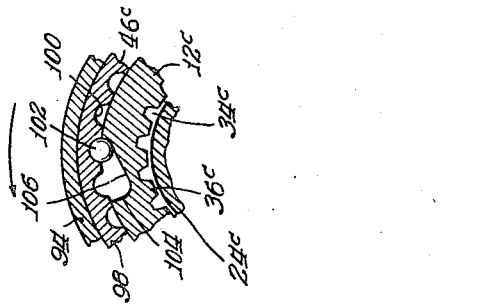
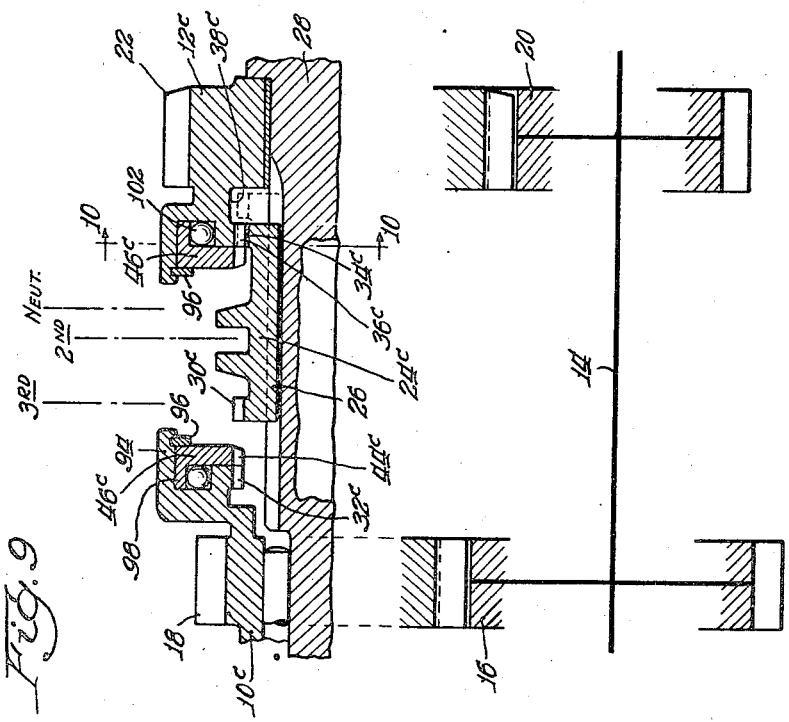

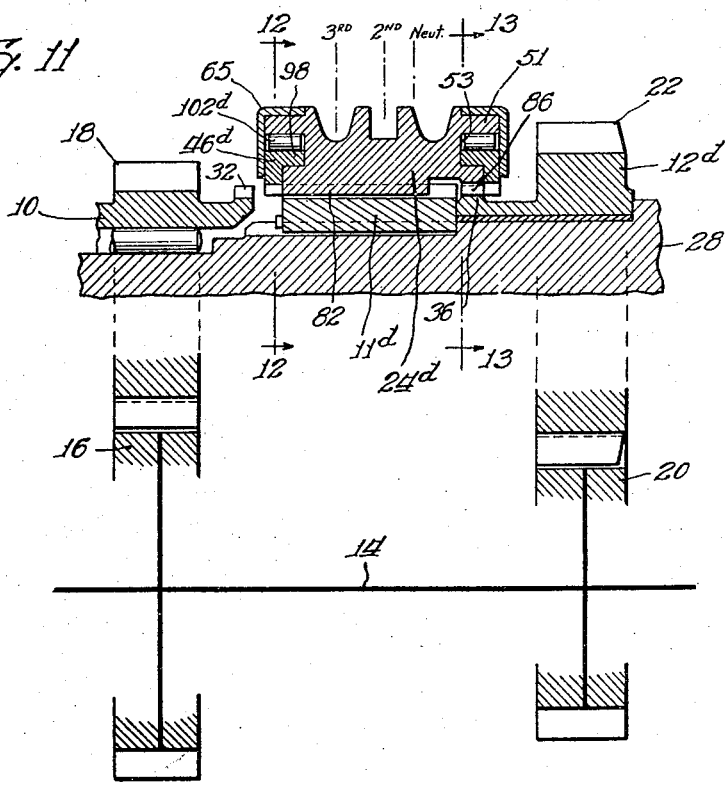
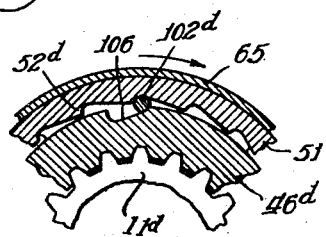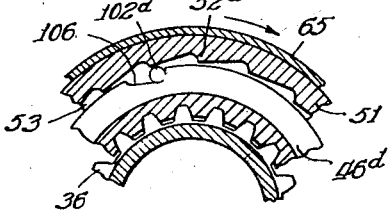

Patented June 22, 1948

2,443,597

UNITED STATES PATENT OFFICE 2,443,597

MULTIPLE CLUTCH CONSTRUCTION WITH SYNCHRONIZING CLUTCHES FOR CHANGE-SPEED TRANSMISSION

Harold E. Carnagua and Clifford L. Swift, Muncie, Ind., assignors to Borg-Warner Corporation, Chicago, Ill., a corporation of Illinois Application June 26, 1943, Serial No. 492,375

16 Claims. (Cl. 192—48)

This invention relates to transmissions of the type, such as the conventional manually shifted three speed transmission employed in the present day automobile, wherein two of the drive ratios are established by selectively meshing an axially shiftable positive clutch member with either of two driving members which are constantly geared together for rotation at different speeds. In such transmissions, the shiftable clutch member has a neutral or non-clutched position which is intermediate the two drive positions, it being necessary to shift through the neutral position in order to shift from one of the driving positions to the other. The operation of such a transmission is attended by certain hazards, particularly under difficult driving conditions such as in traveling over steep mountain roads. Under such driving conditions it is extremely desirable to avoid as far as possible any interruption of the driving connection between the engine and the driven shaft, and our invention has as its general object to provide a clutch mechanism adapted, in a transmission of the type indicated, to effect a shift between two adjacent drive ratios without passing through a neutral position or otherwise interrupting the continued flow of power from the engine to the driven shaft.

Another object of the invention is to provide a clutch mechanism which, in addition to the characteristics stated above, provides for synchronizing the shiftable clutch member with either of the drive members prior to its becoming clutched thereto.

Another object of the invention is to provide a clutch mechanism having the characteristics indicated above, wherein the means for maintaining the uninterrupted drive has the additional function of synchronizing the shiftable clutch member to whichever drive member it is approaching.

The invention further contemplates an arrangement wherein the shift from neutral or non-driving position to second speed drive may be made without passing through any other driving position.

Another object of the invention is to provide a synchronizer or positive clutch in which the foregoing features are achieved in a relatively simple construction.

Other objects, the advantages and uses of the invention will become more apparent after reading the following specification and claims, and after consideration of the drawings forming a part of the specification, wherein:

Fig. 1 is an axial sectional view of a synchronizer embodying the invention, shown in the second-speed position;

Fig. 2 is a transverse sectional view of the same taken on the line 2—2 of Fig. 1;

Fig. 3 is a transverse sectional view of the same taken on the line 3—3 of Fig. 1;

Fig. 4 is an axial sectional view of a modification of the invention, shown in the neutral position;

Fig. 5 is an axial sectional view of the same in the second-speed position;

Fig. 6 is an axial sectional view of the same in direct drive position;

Fig. 7 is an axial sectional view of another modification of the invention, shown in the second-speed position;

Fig. 8 is a transverse sectional view of the same taken on the line 8—8 of Fig. 7;

Fig. 9 is an axial sectional view of another modification of the invention, shown in the second-speed position;

Fig. 10 is a transverse sectional view of the same taken on the line 10—10 of Fig. 9;

Fig. 11 is an axial sectional view of another modification of the invention;

Fig. 12 is a transverse sectional view of the same taken on the line 12—12 of Fig. 11; and Fig. 13 is a transverse sectional view of the same taken on the line 13—13 of Fig. 11, showing the second-speed synchronizing in the ratcheting position.

As an example of one form in which the invention may be embodied, we have shown in Figs. 1, 2 and 3 a synchronizer embodied in a conventional change-speed transmission including a direct drive member 10, a second-speed drive member 12 and a countershaft 14 carrying a gear 16 meshing with a gear 18 on the direct drive member 10 and carrying a second gear 20 meshing with a gear 22 on the second-speed driving member 12, for rotating the driving member 12 from the driving member 10 at a speed that is constantly slower than that of the driving member 10.

A jaw clutch sleeve 24 has a splined connection 26 with the driven shaft 28 of the transmission on which it is shiftable to bring its clutch teeth 30 or 34 into engagement with clutch teeth 32 on the driving member 10, or clutch teeth 36 on the driving member 12. The engagement of the clutch teeth 32 and 30 establishes direct drive while the engagement of the clutch teeth 34 and 36 establishes second-speed drive.

In the conventional synchronizer, the neutral position of the shiftable jaw clutch sleeve is intermediate the two driving positions thereof. The present invention contemplates a relatively simple arrangement in which the neutral position is disposed at one side of the two driving positions, adjacent the second-speed position. To this end, the clutch teeth 36 are separated from the gear member 22 by a channel 38 in which the clutch teeth 34 are accommodated in the neutral position, which is indicated in dotted lines at N in Fig. 1.

The shift from the second-speed position to the direct drive position is facilitated by a synchronizer 44 which includes (Fig. 2) a synchronizer ring 46 rotatably mounted on a pawl retainer ring 48 carried by the driving member 10. The synchronizer ring is provided with peripheral teeth 50, which are adapted to be aligned with the teeth 32, and with internal ratchet teeth 52 which are spaced the same as alternate teeth 50. Pawls 56, mounted in recesses 58 in the ring 48, are urged outwardly into engagement with teeth 52 by means of springs 60 which are seated in openings 62 in the ring 48. We provide a retaining ring 64, L-shaped in cross section including a cylindrical flange 66 pressed into a counterbore 68 in the driving member 10. The ring 64 closes the sides of the recesses 58 to form pockets in which the pawls 56 are confined. The springs 60 bottom against the flange 66.

For facilitating the downshift from direct drive to second speed, we provide a second-speed synchronizer 72 which is constructed similarly to the synchronizer 44.

The pawls 56 of the direct drive synchronizer 44 are arranged so that in the upshift from second speed to direct, (which is accomplished by exerting pressure against the jaw member 24 urging it toward the direct drive clutch 32 while a decelerating load is maintained on the driving members 10 and 12) the synchronizer 44 will ratchet from the time the teeth 30 mesh with the teeth 50 until the decelerating load has brought the speed of the driving member 10 down to that of the jaw member 24. The pawls 56 will then engage the ratchet teeth 52 and, owing to the related spacing of the teeth 52 and the teeth 50, will line up the teeth 50 and 32 so that the teeth 30 of the clutch sleeve 24 will freely slide into mesh with the teeth 32.

The pawls in the synchronizer 72 are so arranged that in the downshift from direct drive to second speed (which is effected by exerting pressure against the clutch sleeve 24 toward the second-speed clutch 36 while maintaining driving torque on the driving members 10 and 12), the pawls will ratchet while the speed of the driving member 12 is accelerated to equal that of the jaw member 24, whereupon the pawls 56 will become engaged with the teeth 52 and will line up the teeth 50 of the synchronizer with the teeth 36, thus permitting the teeth 34 to slide freely into meshing engagement with the teeth 36.

The shiftable clutch sleeve 24 is provided with an annular channel 74 adapted to be engaged by the conventional shifting mechanism for shifting the sleeve back and forth.

The splines 26 may be helical as shown, so that the shifting of the sleeve 24 will be effected by torque reaction. The conventional shifting mechanism that is contemplated is one having poppet latch mechanism for yieldingly holding the sleeve 24 against the action of the torque responsive mechanism until the operator initiates the shift by manually moving the shift mechanism until the poppet connection is released.

Should it be desired to place the transmission in neutral, from the aforedescribed second speed condition, this can be readily accomplished by effecting shifting of the clutch sleeve 24 toward the right, as viewed in Fig. 1, to the position N shown in dotted lines wherein the teeth 34 are disengaged from the teeth 36 and are disposed in the channel 38.

The use of a ratchet type synchronizer makes it possible to synchronize in the shift from direct drive to second speed, and yet to go through the second-speed position to reach neutral.

In the form of the invention shown in Figs. 4–6, the construction and operation and the numerals referring thereto are the same as in the synchronizer above-described with the following exceptions:

The shiftable clutch sleeve 24a is mounted upon a hub 11, being splined thereto by straight axially extending splines 13. The hub 11 has helical splines meshing with helical splines 15 on the driven shaft 28a. Thrust is transmitted from the jaw clutch sleeve 24a to the hub 11 by a poppet ball 17 mounted in a bore 19 in the sleeve 24a and urged by a spring 21 into engagement with the hub 11, being adapted to seat in a depression 23 or a depression 25 in the hub.

Synchronization of the teeth 30 of the slidable clutch sleeve 24a with the direct drive clutch teeth 32 is effected by a face ratchet type of one-way drive connection, comprising ratchet teeth 27 formed on the driving member 10a and ratchet teeth 29 formed on a ring 31 which has internal teeth 33 meshing with the splines 15 of the driven shaft. The ring 31 is normally maintained in engagement with the teeth 30 of the shiftable clutch member by a plurality of springs 35 mounted in bores 37 in the hub 11 and engaging the inner face of the ring 31.

Synchronization of the clutch sleeve 24a with the second-speed driving member 12a on the downshift from direct to second is effected by a similar ratchet synchronizer comprising a ratchet ring 39 having teeth 41 in splined engagement with the splines 15 and having face ratchet teeth 43 engageable with ratchet teeth 45 on the driving member 12a. The ring 39 is urged toward engagement with the teeth 45 by springs 47 mounted in bores 49 in the hub 11.

Figs. 4, 5, and 6 show portions of the inside faces of the ratchet teeth 27, 29, 43 and 45.

In the neutral position of the synchronizer, the poppet ball 17 is engaged in the recess 25 of the hub 11, the clutch sleeve 24a being shifted to the right with reference to the hub 11, and the clutch teeth 34 being accommodated in the channel 38, all as shown in Fig. 4. With the driven shaft 28a stationary and the driving members 10a and 12a rotating under engine idling conditions, the ratchet teeth 43 and 45 will ratchet as indicated by the arrow in Fig. 4.

In the shift from neutral to second speed, the clutch sleeve 24a is moved to the left, carrying with it the hub 11 and synchronizer ring 31, the poppet ball 17 remaining engaged in the recess 25. Synchronizer ring 39 will remain thrust against the teeth 45 by the springs 47 which will expand as the hub 11 moves to the left and, upon releasing the engine clutch, the ratcheting engagement of the teeth 43 against the teeth 45 under the pressure of the springs 47, will assist in decelerating the driving member 12a. Assuming the driven shaft 28a to be stationary, when the rotation of the driving member 12a has stopped, the teeth 34 and 36 will be aligned for coupling as a result of the camming effect of the coacting inclined faces of the teeth 43 and 45 under the pressure of the springs 47, which tends to bring the teeth into full engagement as shown in Fig. 5. The movement of the sleeve 24a may then be continued until the teeth 34 mesh with the teeth 36, establishing second speed drive. Where the shift to second is made from a lower gear ratio, the aligning action will take place when the driving member 12a has slowed down to the speed of the driven shaft and tends to lag behind the driven shaft.

In the shift from second speed to direct drive, the clutch sleeve 24a is again moved to the left, carrying with it the hub 11 and synchronizer ring 31, the poppet ball 17 remaining in engagement with the recess 25, and the springs 47 expanding to maintain the teeth 43 and 45 of the second speed synchronizer in engagement with each other until ratcheting engagement of the teeth 29 and 27 of the direct drive synchronizer has been established. A deceleration load having been established on the driving member 12a at the beginning of the shift, both of the one-way drive connections will ratchet while the driving member 10a slows down to the lower speed of the driven member 28a. Continued movement of the sleeve 24a toward the direct drive member 10a will cause yielding pressure to be exerted against the ratcheting teeth 27 and 29 by the springs 35. This ratcheting under spring pressure will assist the deceleration of the driving member 10a until the latter commences to rotate more slowly than the driven member, whereupon the teeth 27 and 29 will positively engage, positioning the teeth 30 and 32 in proper meshing alignment.

The engagement of the direct drive ratchet teeth 27 and 29 will maintain the clutch teeth 30 out of contact with the teeth 32 as long as the shifting pressure against the clutch sleeve 24a is not increased sufficiently to move the teeth 30 away from the ratchet ring 31. When synchronization has been effected, however, the shifting pressure will be increased sufficiently to overcome the resistance of the springs 35 and the poppet connections 17, 21, 25, whereupon the poppet ball 17 will yield, the sleeve 24a will move to the left until the teeth 30 are meshed with the teeth 32, and the poppet ball 17 will reseat in the recess 23, yieldingly latching the sleeve 24a in the direct drive position. In overcoming the poppet resistance, the springs 35 will be compressed until the hub 11 engages the inner side of the ring 31 establishing positive abutment, but as the poppets yield, the springs 35 will move the hub 11 back to the right while the sleeve 24a shifts to the left, the hub being substantially centered between the synchronizer in the final clutching position, as shown in Fig. 6. It will be understood that as the sleeve 24a shifts to the left the teeth 34 are disengaged from the teeth 36, and that the teeth 34 engage the ratchet ring 41 and shift it axially so that the ratchet teeth 43 thereof are free of the ratchet teeth 45.

The downshift from direct drive to second speed is a reversal of the upshift, the driving members 10a and 12a being accelerated while shifting pressure to the right is exerted against the sleeve 24a, the direct drive synchronizer ratcheting while the speed of the second speed driving member 12a is accelerated to that of the sleeve 24a and hub 11, the teeth 36 and 34 being aligned by the second speed synchronizer when the driving member 12a tends to rotate ahead of the driven member, and the movement of the sleeve 24a to the right to establish full clutching engagement of the teeth 36 and 34 being then completed. In this operation the poppet connection 17, 23 will yield and the poppet ball 17 will then be reseated in the depression 25.

In the form of the invention shown in Figs. 7 and 8 the construction and operation and the numerals employed to designate the parts are the same as in the form shown in Figs. 1 and 2 with the following exceptions:

The jaw clutch sleeve 24b is slidably mounted on a hub 11b which has a conventional splined connection 13b with the driven shaft 28 and is maintained in axially fixed position by thrust bearing washers 78 and 80 which cooperate with annular flanges 92 on members 10b and 12b to confine ratchet rings 46. The sleeve 24b has internal splines 82 meshing with external splines 84 on the hub 11b. Sleeve 24b has internal clutch teeth 86 aligned with the splines 82, adapted to engage second speed clutch teeth 36 of the driving member 12b, and spaced from the splines 82 by a neck portion 88 adapted to bridge the clutch teeth 36 in the neutral position wherein the teeth 36 are received in the annular space 38.

The ratchet synchronizer rings 46 cooperate with ratchet pawls 56b of leaf spring construction, the pawls being welded to the driving members 10b and 12b as at 90. The operation is substantially the same as in the form shown in Figs. 1 and 2.

In the form of the invention shown in Fig. 9, the construction and operation and the reference numerals used to designate the parts are the same as in the form shown in Fig. 1, with the following exceptions:

The clutch sleeve 24c is of relatively small diameter, being splined directly to the shaft 28 at 26, and its clutch teeth 30c and 34c are of the external type, and are adapted to engage internal teeth 32c and 36c on the driving members 10c and 12c respectively. The teeth 34c are received in an annular space 38c in the driving member 12c when the synchronizer is in the neutral position.

The ratchet rings 46c are rotatably mounted within collar flanges 94 on the driving members 10c and 12c respectively, being retained therein by snap rings 96. They are provided with internal teeth 44c adapted to mesh with the teeth 30c and teeth 34c respectively of the clutch sleeve 24c. Each ratchet ring 46c has an axially extending flange 98 formed with internal semi-cylindrical recesses 100 in which ratchet balls 102 are adapted to engage as shown in Fig. 10. The driving members 10c and 12c are provided with recesses 104, sufficiently deep at one end to permit the balls 102 to ratchet past the recesses 100 of the ratchet ring, and formed with camming ramps 106 for forcing the balls 102 outwardly into the recesses 100.

In the form of the invention shown in Figs. 11 to 13, the construction and operation and the reference characters used to designate the parts are the same as in the form of the invention shown in Figs. 1 and 10, with the following exceptions:

The ratchet rings 46d are rotatably mounted within axially projecting flanges 51 on the clutch sleeve 24d, and the axially extending flanges 98 of the ratchet rings are received in annular recesses 53 in the sleeve 24d. The ratchet rings 46d are retained by sheet metal collars 65 pressed on the flanges 51. In place of the spherical ratchet elements 102 in the previous form of the invention, we employ rollers 102d which are adapted to engage the internal ratchet teeth 52d in the ratchet rings 51, when cammed outwardly by the ramps 106. The sleeve 24d is similar to that shown in Fig. 7, having splines 82 adapted to engage the direct drive clutch teeth 32 and separate teeth 86 adapted to engage the second speed clutch teeth 36.

In construing the claims herein, the gears 10 and 12 (or any corresponding or equivalent elements) obviously may be considered a pair of relatively rotatable (torque transmitting) members; and either the shaft 28 (or any corresponding or equivalent element) or the hub member 11 (or any corresponding or equivalent member) obviously may be considered a third torque transmitting member.

It may now be noted that the invention in each of its modifications provides a drive from the driving members to the driven member which is uninterrupted in the sense that during the shift from one drive to another the synchronizer ratchets are constantly in driving position during the shift, and although there is a hiatus during which they will ratchet, they are instantly effective to transmit a drive as soon as the proper relative speeds of the driving and driven members are established.

We claim:

1. In a coupling, in combination with a pair of relatively rotatable torque transmitting members each having a set of external coupling teeth, a third torque transmitting member, and means for selectively coupling said third torque transmitting member to either of said pair of members, comprising a coupling member having internal coupling teeth, said coupling member being non-rotatably connected to said third member and shiftable thereon to mesh its teeth with either of said sets of coupling teeth, the teeth of said coupling member and the teeth of one of said pair of members being each connected to its respective member by an untoothed portion thereof, said untoothed portions each being adapted to bridge the teeth carried by the other to establish a neutral position remote from one of the coupling positions.

2. A synchronizing coupling as defined in claim 1, wherein the pair of torque transmitting members are selectively connectable with the coupling member in two different coupling positions of said coupling member to provide different speed ratios for driving the third torque transmitting member and the neutral position of said coupling member is adjacent the lower speed ratio position of the two coupling positions.

3. In a coupling, in combination with two axially opposed coaxial relatively rotatable members each having a set of external coupling teeth, a third member, and means for selectively coupling said third member to either of the other members, comprising a coupling member having internal coupling teeth, said coupling member being non-rotatably connected to said third member and shiftable thereon to mesh its teeth with either of said sets of coupling teeth, and synchronizers operatively interposed between said coupling member and the respective other members for synchronizing the coupling member with the other member toward which it is being moved, the teeth of said shiftable coupling member and the teeth of one of said other members being each connected to its respective member by untoothed portions of the respective members, said untoothed portions each being adapted to bridge the teeth carried by the other to establish a neutral position at one side of the two coupling positions of said coupling.

4. In a synchronizer, in combination with a pair of driving members each having clutch teeth, and a driven member, a hub member drivingly connected to said driven member and shiftable axially thereon, a toothed clutch sleeve drivingly connected to said hub member and shiftable axially thereon to couple its teeth selectively with either of said driving member clutch teeth, synchronizers interposed between said hub and the respective driving members, means for yieldingly transmitting thrust from the hub to the respective synchronizers, and means for transmitting thrust from the clutch sleeve to the hub, said last means being adapted to yield to permit the clutch sleeve to move from a neutral position uncoupled from both sets of clutch teeth to a position coupled with one set of the clutch teeth.

5. In a coupling, in combination with a pair of relatively rotatable members, at least one of which has clutch teeth, a clutch sleeve having teeth adapted to be coupled with said clutch teeth, a hub on which said sleeve is mounted for shifting movement into couple with said clutch teeth, said hub being axially shiftable on the other of said members and connected to said other member and to said sleeve for transmitting torque therebetween, a synchronizer interposed between said hub and said one member, resilient means for transmitting thrust from said hub to said synchronizer, and means for yieldably latching said sleeve to said hub in either of two axially spaced positions of said sleeve relative to said hub.

6. In a coupling, in combination with two axially opposed coaxial relatively rotatable members each having a set of external coupling teeth, a rotatable member, and means for selectively coupling said rotatable member to either of said relatively rotatable members, comprising a coupling sleeve having internal coupling teeth at its respective ends, shiftable into couple with either of said sets of external coupling teeth, a pair of synchronizer rings each having a peripheral portion normally engaged against the inner radial faces of said internal coupling teeth at a respective end of said sleeve, and resilient means thrusting axially outwardly against said rings and urging them toward engagement with said radial faces.

7. In a coupling, in combination with a pair of coaxial relatively rotatable members to be coupled, one having external coupling teeth, a coupling sleeve drivingly connected to and axially shiftable on the other member and having teeth projecting inwardly and adapted to mesh with said coupling teeth, a synchronizer ring within said sleeve having a direct torque transmitting connection with said other member and having a peripheral portion lapping said inwardly extending teeth, and resilient means normally maintaining said ring in engagement with the inner radial surfaces of said inwardly extending teeth, and adapted to yield to permit said inwardly extending teeth to move away from said ring in order to establish coupling engagement with said coupling teeth.

8. In a synchronizer, in combination with a pair of relatively rotatable torque transmitting members to be synchronized, said members having respective internal and external meshable clutch teeth and being relatively shiftable axially to mesh said teeth, means for synchronizing said members comprising a pair of annular elements one having synchronizer teeth alignable with the teeth of one of said members and meshable with the teeth of the other, said annular elements being disposed one within the other and one having ratchet teeth facing the other, and ratchet elements controlled by the last mentioned annular element and engageable with said ratchet teeth, said ratchet teeth being arranged relative to said synchronizer teeth so as to position said synchronizer teeth in alignment with the teeth of said one member when said ratchet teeth are positively engaged by said ratchet elements.

9. In a synchronizing coupling, in combination with driving members adapted to drive at two different speed ratios and a driven member, a coupling member for coupling either of said driving members with said driven member, said driving and coupling members having meshable clutch teeth and said coupling member being relatively shiftable axially into two different engaged positions to engage with said driving members, means for synchronizing said coupling member with either of said driving members comprising for each of the driving members a pair of annular elements one having synchronizer teeth alignable with the teeth of the driving member and meshable with the teeth of said coupling member, said annular elements being disposed one within the other and one having ratchet teeth facing the other, and ratchet elements controlled by the last mentioned annular element and engageable with said ratchet teeth, said ratchet teeth being arranged relative to said synchronizer teeth so as to position said synchronizer teeth in alignment with the teeth of said driving member when the ratchet teeth are positively engaged by said ratchet elements, the teeth of said driving and coupling members each being connected with its respective member by untoothed portions of said members, said untoothed portions of each of said driving and coupling members being adapted to bridge the teeth of another of said last named members whereby to establish a neutral position of the coupling member which is remote from one of its engaged positions.

10. A synchronizer as defined in claim 8, wherein the annular element which carries said synchronizer teeth is in the form of a separate ring, and an annular retainer spaced from a radial surface of said one member to form an annular channel in which said ratchet elements and said ring are confined, with said synchronizer teeth projecting beyond said channel.

11. A synchronizer as defined in claim 8, wherein at least one of said annular elements is in a form of an independent ring, said synchronizer including an annular retainer carried by said one member and spaced from a radial surface of said one member to define an annular channel in which a portion of said ring is confined, with said synchronizer teeth projecting therefrom.

12. A synchronizer as defined in claim 8, wherein said ratchet elements are in the form of pawls, said last mentioned annular element comprises a ring having recesses each receiving a pawl and fulcruming the same at one end thereof, the first mentioned annular element comprises a ring in which said synchronizer teeth are formed externally and said ratchet teeth are formed internally, said synchronizer including a retainer ring, L-shaped in cross section, mounted in said one member and having a radially outwardly extending flange confining said pawl retaining ring and the inner portion of the toothed ring between itself and an end surface of said one member.

13. A synchronizer as defined in claim 8, wherein said one member has an axially opening recess defined on the outer side by an axially extending cylindrical flange and said other annular element having camming recesses, wherein said ratchet elements are in the form of rolling elements normally received in said recesses, and wherein said one annular element comprises a separate ring having a radially inwardly extending flange formed with said synchronizer teeth and a flange extending axially into said axially opening recess and formed with internal recesses into which said rolling elements are adapted to be cammed by said cam recesses, and means carried by said cylindrical flange for confining said ring with its flange extending into said axially opening recess.

14. A synchronizer as defined in claim 8, wherein said other annular element comprises a flange on said one member, said flange having internal ratchet teeth, and wherein said one annular element is disposed within said flange, and is provided with peripheral camming pockets, wherein said ratchet elements are in the form of rolling elements normally received in said camming pockets and adapted to be cammed outwardly thereby into positive engagement with said ratchet teeth, and including a retainer ring mounted on the periphery of said one member and having a flange projecting radially inwardly and spaced from a radial surface of said one member to define an annular channel in which said one annular element and said ratchet elements are confined with said synchronizer teeth projecting radially inwardly from said channel.

15. In a synchronizing coupling, in combination with direct drive and second speed driving members each having a set of clutch teeth, a driven member, a coupling sleeve having teeth and shiftable selectively into clutching engagement with either of said sets of clutch teeth, a hub member slidably mounted on the driven member for movement between the two driving positions, said coupling sleeve being slidable axially on said hub member, means for yieldably latching said sleeve to said hub member in either of two positions in one of which said sleeve is permitted to assume a neutral position and may shift into coupling engagement with one of said sets of clutch teeth and in the other of which said sleeve may shift into coupling engagement with the other of said sets of clutch teeth, and synchronizing devices operatively interposed between said shiftable coupling sleeve and the respective driving members, said coupling member having a neutral position remote from one of its coupling positions.

16. In a synchronizing coupling, in combination with direct drive and second speed driving members each having a set of clutch teeth, a driven member, a coupling sleeve having teeth and shiftable selectively into clutching engagement with either of said sets of clutch teeth, a hub member slidably mounted on the driven member for movement between the two driving positions, said coupling sleeve being slidable axially on said hub member, means for yieldably latching said sleeve to said hub member in either of two positions in one of which said sleeve is permitted to assume a neutral position and may shift into coupling engagement with one of said sets of clutch teeth and in the other of which said sleeve may shift into coupling engagement with the other of said sets of clutch teeth, synchronizing devices operatively interposed between said shiftable coupling sleeve and the respective driving members, said coupling member having a neutral position remote from one of its coupling positions, said synchronizers each including a ring having face ratchet teeth thereon, coacting face ratchet teeth on the respective driving members, and yielding means interposed between the hub member and the respective ratchet rings and adapted, when the hub member is shifted toward either driving member, to urge the respective ratchet ring into engagement with the coacting ratchet teeth of that member.

HAROLD E. CARNAGUA.
CLIFFORD L. SWIFT.

REFERENCES CITED

The following references are of record in the file of this patent:

UNITED STATES PATENTS

| Number | Name | Date |
|---|---|---|
| 2,202,271 | Sinclair et al. | May 28, 1940 |
| 2,225,174 | Keller | Dec. 17, 1940 |
| 2,245,017 | Sinclair | June 10, 1941 |
| 2,258,475 | Sinclair | Oct. 7, 1941 |
| 2,259,527 | Manville | Oct. 21, 1941 |
| 2,269,668 | Keller | Jan. 13, 1942 |
| 2,286,549 | Keller | June 16, 1942 |

FOREIGN PATENTS

| Number | Country | Date |
|---|---|---|
| 102,530 | Sweden | July 10, 1941 |